(12) United States Patent
Braun

(10) Patent No.: US 12,001,170 B2
(45) Date of Patent: Jun. 4, 2024

US012001170B2

(54) MONTH AND LEAP YEAR DISPLAY MECHANISM FOR TIMEPIECES

(71) Applicant: GLASHÜTTER Uhrenbetrieb GmbH, Glashütte/Sachsen (DE)

(72) Inventor: Tony Braun, Müglitztal (DE)

(73) Assignee: GLASHÜTTER Uhrenbetrieb GmbH, Glashütte/Sachsen (DE)

( * ) Notice: Subject to any disclaimer, the term of this patent is extended or adjusted under 35 U.S.C. 154(b) by 469 days.

(21) Appl. No.: 17/420,290

(22) PCT Filed: Feb. 10, 2020

(86) PCT No.: PCT/EP2020/053330
§ 371 (c)(1),
(2) Date: Jul. 1, 2021

(87) PCT Pub. No.: WO2020/165095
PCT Pub. Date: Aug. 20, 2020

(65) Prior Publication Data

US 2022/0091563 A1 Mar. 24, 2022

(30) Foreign Application Priority Data

Feb. 14, 2019 (EP) .................................... 19157299

(51) Int. Cl.
*G04B 19/253* (2006.01)

(52) U.S. Cl.
CPC ..... *G04B 19/253* (2013.01); *G04B 19/25366* (2013.01)

(58) Field of Classification Search
CPC ............ G04B 19/253; G04B 19/25366; G04B 19/247; G04B 19/25333; G04B 19/25353
See application file for complete search history.

(56) References Cited

U.S. PATENT DOCUMENTS

| | | | | |
|---|---|---|---|---|
| 3,842,590 A * | 10/1974 | Kato | G04B 47/003 | 368/35 |
| 2005/0232085 A1* | 10/2005 | Scheufele | G04B 19/2538 | 368/37 |
| 2011/0134726 A1* | 6/2011 | Hirokawa | G04B 19/247 | 368/37 |

FOREIGN PATENT DOCUMENTS

| | | |
|---|---|---|
| CH | 662 696 A3 | 10/1987 |
| CH | 711 224 A1 | 12/2016 |

(Continued)

OTHER PUBLICATIONS

International Search Report for PCT/EP2020/053330 dated Apr. 24, 2020.
Written Opinion for PCT/EP2020/053330 dated Apr. 24, 2020.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

Display mechanism (10) for a timepiece (1000), with a leap year display integrated in a month display, comprising a control mechanism (3) that drives, once per month, about an axis (D), a month display wheel set (2) arranged underneath a dial (1), having a month window (1C) in a quadrant allowing the display of only one quarter of the month display wheel set (2), which completes one revolution in four years, and bears, on an angular sector of 90°, at least one characteristic leap year marking, and either carries indices, each arranged to indicate one month on a static month scale of the dial (1), or equidistant month markings, wherein one of the month markings is pointed to by a fixed mark of the dial (1).

20 Claims, 7 Drawing Sheets

(56) References Cited

FOREIGN PATENT DOCUMENTS

| | | | |
|---|---|---|---|
| DE | 20 2018 101 522 | U1 | 5/2018 |
| WO | 01/48568 | A1 | 7/2001 |

* cited by examiner

MONTH AND LEAP YEAR DISPLAY MECHANISM FOR TIMEPIECES

CROSS REFERENCE TO RELATED APPLICATIONS

This application is a National Stage of International Application No. PCT/EP2020/053330 filed Feb. 10, 2020, claiming priority based on European Patent Application No. 19157299.9 filed Feb. 14, 2019.

FIELD OF THE INVENTION

The invention concerns a month and leap year display mechanism for a timepiece.

The invention concerns the field of timepiece complications comprising a calendar.

BACKGROUND OF THE INVENTION

Calendar mechanisms are one of the classic timepiece complications. Some complex mechanisms are able to manage the duration of months or years. Leap year displays or indicators allow the user to determine whether or not the current year is a leap year, and, depending on the level of complexity of the watch, can manage the display of the last day of February, and the correct change to the first of March.

In the case of the simplest calendar mechanisms, simply knowing whether or not the current year is a leap year allows the user to make the right correction to the display on the last days of the current month, generally by means of the control stem. The mechanisms differ depending upon whether they concern a simple date calendar, an annual calendar or a perpetual calendar. In these latter cases, the leap year control mechanism requires expensive components, for example a Maltese cross-shaped cam, and take up a certain amount of space inside the watch case, or the case of the timepiece if it is static like a clock.

The leap year display is often achieved by displaying a sector of a disc with four quadrants inside a small window, or by the cooperation of an index with one part of such a disc.

WO Patent No. 01/48568 in the name of BELPANORM discloses a perpetual calendar mechanism actuated by a motorized wheel of a timepiece movement and displaying at least the calendar date. It is composed exclusively of rotating movable elements formed by gears and the drive wheel makes one revolution per day instantaneously at midnight. One of the gears is a date wheel driving a movable element displaying the date. The date wheel comprises thirty-one teeth and is driven at a rate of one step per day by a drive tooth integral with the drive wheel. At least one of the other gears is a movable element for the length of the months, capable of being driven in the last four days of the month by a control wheel integral with the date wheel; this movable element for the length of the months comprises a set of teeth composed of a set of 0 to 3 groups of teeth, each of the groups corresponding to a month of the year. The date wheel is driven at the end of months of thirty-one days by a number of steps corresponding to the difference between thirty-one and the number of days of the month concerned by an adjustment clock train comprising at least one drive pinion integral with the drive wheel, the movable element for the duration of the month, the date drive pinion and the control wheel.

SUMMARY OF THE INVENTION

The present invention proposes to combine a display of the current month with a display of the current year type (leap year or non-leap year), with a very simple, inexpensive, very reliable, easy to correct mechanism, which is confined to a reasonable space inside the timepiece concerned.

To this end, the invention concerns a month and leap year display mechanism for a timepiece according to claim 1.

The invention also concerns a calendar mechanism comprising a date mechanism arranged to cooperate with a timepiece movement and comprising at least one such month and leap year display mechanism, according to claim 17.

The invention also concerns a timepiece comprising at least one timepiece movement arranged to drive at least one such month and leap year display mechanism, and/or to drive at least one such calendar mechanism.

BRIEF DESCRIPTION OF THE DRAWINGS

Other features and advantages of the invention will appear upon reading the following detailed description, with reference to the annexed drawings, in which:

FIG. 3 represents, in a similar manner to FIG. 1, the entire month display wheel set, which carries four triangular indices, one of which, in proximity to six o'clock, is different from the other three and is the leap year indicator, and the cooperation of this month display wheel set with the control mechanism.

FIG. 4 is a detail view of this control mechanism, close to the end of the month, from its input at an input wheel set 31, arranged to be driven by the movement or by a date mechanism, and having a finger arranged to pivot a first star wheel, which drives a stop wheel via a gear train; this stop wheel comprises hollows arranged to cooperate with a click returned by a spring to a rest position, and it is integral with a second star wheel arranged to drive pins of the month display wheel set when the stop wheel pivots, and to hold these pins in position when the stop wheel is kept stationary by the click in the absence of pivoting of the first star wheel.

FIG. 5, similar to FIG. 4, is the representation of the state of the control mechanism on the eighth day of a month.

FIG. 6, similar to FIG. 4, is the representation of the state of the control mechanism on the last day of a month, just before midnight and the jump in rotation of the second star wheel to drive the month display wheel set.

FIG. 7 illustrates this crystal and the month display wheel set separately.

FIG. 9 illustrates the superposition thereof in the month of October in a leap year, during which a chequered lower marking specific to a leap year is visible through the opening in the letters of the month of October.

FIG. 11 represents in a similar manner to FIG. 3, the entire month display wheel set of the first variant, and the cooperation of this month display wheel set with the control mechanism, and, in proximity to the stem at three o'clock, a month correction mechanism.

FIGS. 12 and 13, respectively plan and perspective views, illustrate the detail of a correction wheel, arranged to move a correction pinion integral with a correction star wheel, which is arranged to drive the pins of the month display wheel set, in the same manner as the second star wheel at the end of the month.

DETAILED DESCRIPTION OF PREFERRED EMBODIMENTS

Figure 1:
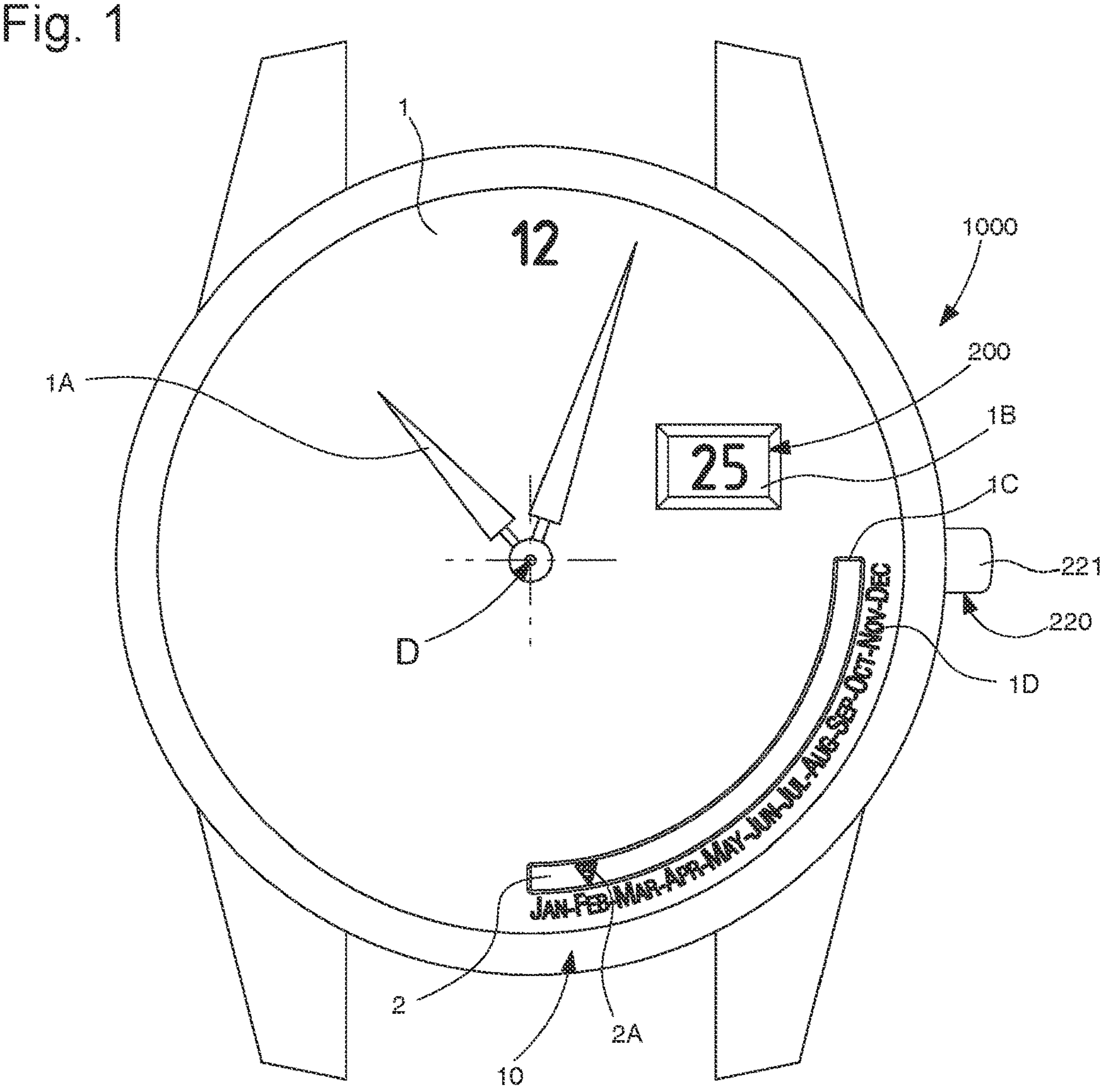
FIG. 1 represents schematically, and in a plan view, a watch that comprises a calendar mechanism, with a date mechanism with the date display in a date window at around three o'clock, in proximity to the control stem of the watch, and with a month and leap year display mechanism according to the invention, which comprises a month display window extending over a quadrant between three o'clock and six o'clock, in a first variant wherein a static month scale extends over the watch dial along this month window, and wherein a month display wheel set comprises an annular track which bears four different indices, each appearing in the window for one year only and pointing to the name of the current month; the Figure shows an index specific to the leap year which points to the current month of February.

The invention concerns a month and leap year display mechanism 10 for a timepiece 1000. FIG. 1 illustrates one such timepiece 1000, here a watch, which comprises a conventional time display 1A via hour and minute hands, a date mechanism 200 with a date display 1B, a control stem 221 which controls, in particular, a date corrector 220, and a month and leap year display mechanism 10 according to the invention.

According to the invention, this mechanism 10 includes a leap year display integrated in a month display. The invention is described in the particular non-limiting case of a Gregorian calendar display, but lends itself perfectly to other types of calendar, notably of the lunar or Zodiac type, which those skilled in the art will know how to make by replacing the device for changing the display at the end of the month, which will be described hereinafter, with device for changing the display at the end of a lunar month, or at the end of any ad hoc period.

Depending on the configuration of the timepiece, mechanism 10 either comprises a movement 100, or mechanism 10 is arranged to cooperate with a movement 100. In both cases, this movement 100 is arranged to drive a month display wheel set 2, formed in particular but not exclusively by a display ring or a display disc, via a control mechanism 3, comprised in mechanism 10. This month display wheel set 2 is arranged to rotate about an axis of rotation D and is arranged underneath a cover plate or underneath a dial 1. This dial 1 or cover plate, for example a bridge, or suchlike, comprises a month window 1C, which is contained within an angular sector of 90° about axis of rotation D. This month window 1C is arranged to allow a user to see a quarter of month display disc 2, while the other three quarters of month display disc 2 are concealed from the user, by dial 1 and/or at least one fixed portion of timepiece 100.

According to the invention, control mechanism 3 is arranged to make month display wheel set 2 complete one revolution in four years. Thus, month display wheel set 2 rotates by one forty-eighth of a revolution at the end of each month.

And this month display wheel set 2 bears, on an angular sector of 90°, at least one characteristic leap year marking.

And month display wheel set 2 either carries indices, which are each arranged to indicate one month on a static month scale of dial 1, or equidistant month markings, wherein one of the month markings is pointed to by a fixed mark of dial 1.

The Figures illustrate the design of such a leap year display, which includes, in this particular and non-limiting version, a cover plate, particularly in the form of a dial 1, of a month display wheel set 2 which is a ring, or a disc bearing an annular display track, and a control and distribution mechanism 3. Month display wheel set 2 is mounted to pivot about axis of rotation D. Control mechanism 3, driven by movement 100 or by a date mechanism 200, has the function of driving month display wheel set 2 one angular pitch, at each change of month, and of returning month wheel set 2 to a new rest position until it is actuated at the end of the next month.

Figure 2:
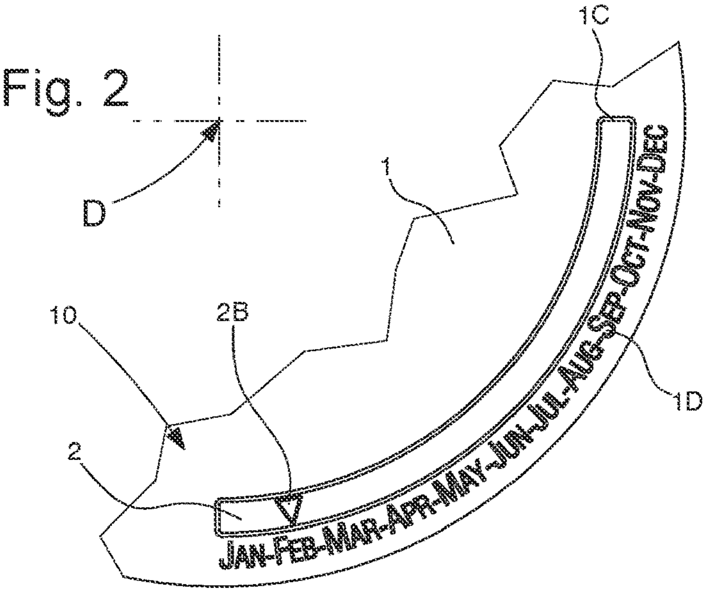
FIG. 2 represents, in a similar manner to FIG. 1, a detail of the same watch when it is an ordinary year: an ordinary year index replaces the special leap year index of FIG. 1, and points to the month of February of the current year.
Figure 3:
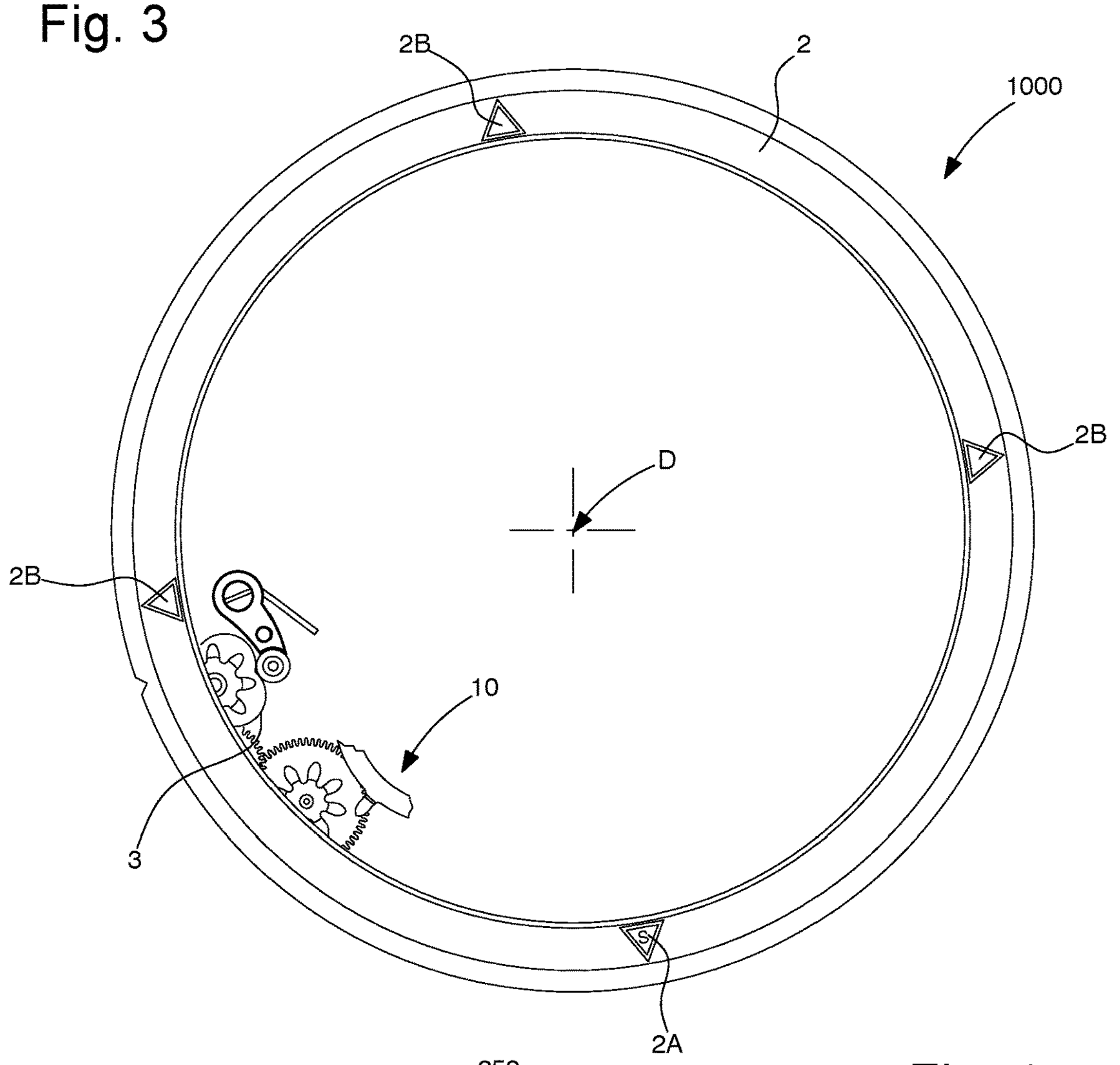
FIGS. 3 to 6 illustrate the control mechanism of the month display wheel set.
Figure 4:
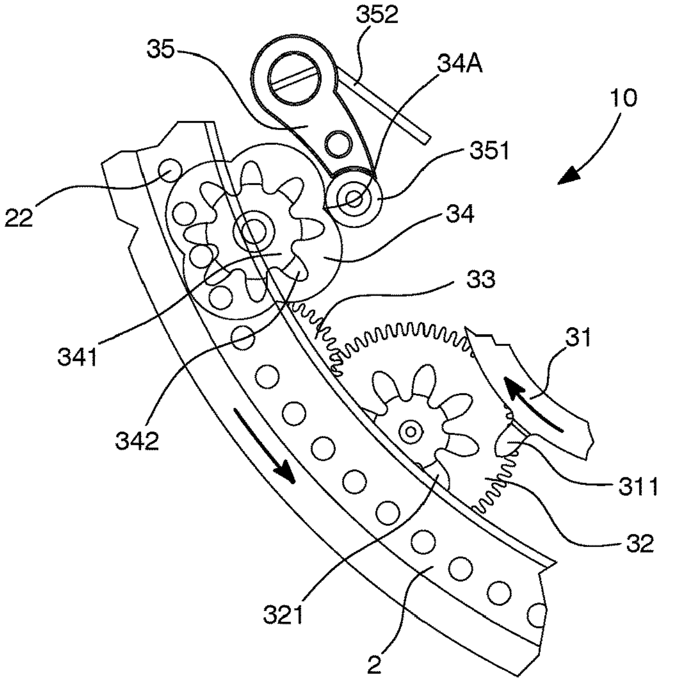
Figure 5:
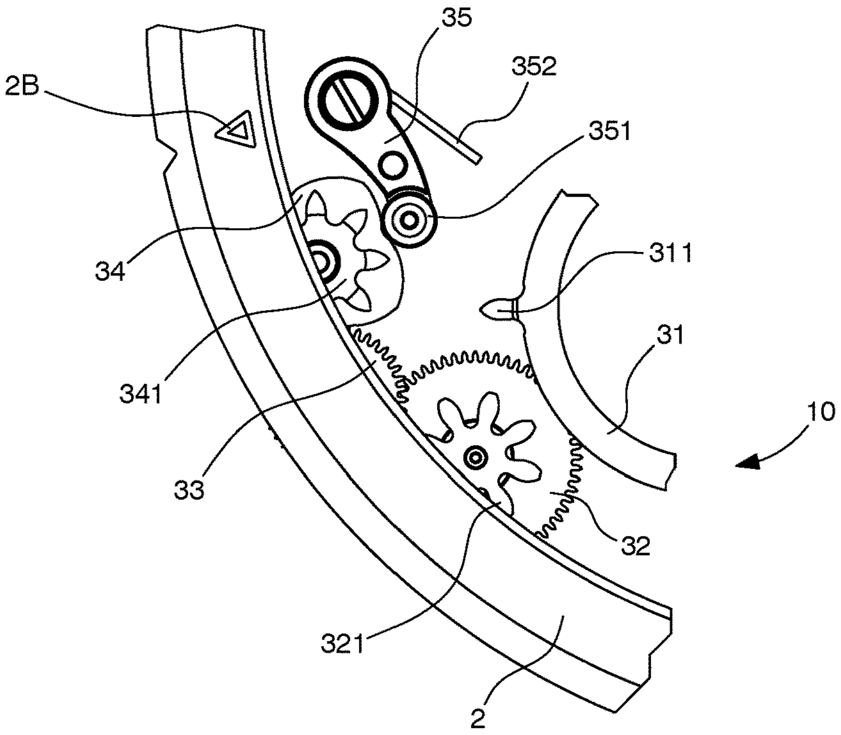
Figure 6:
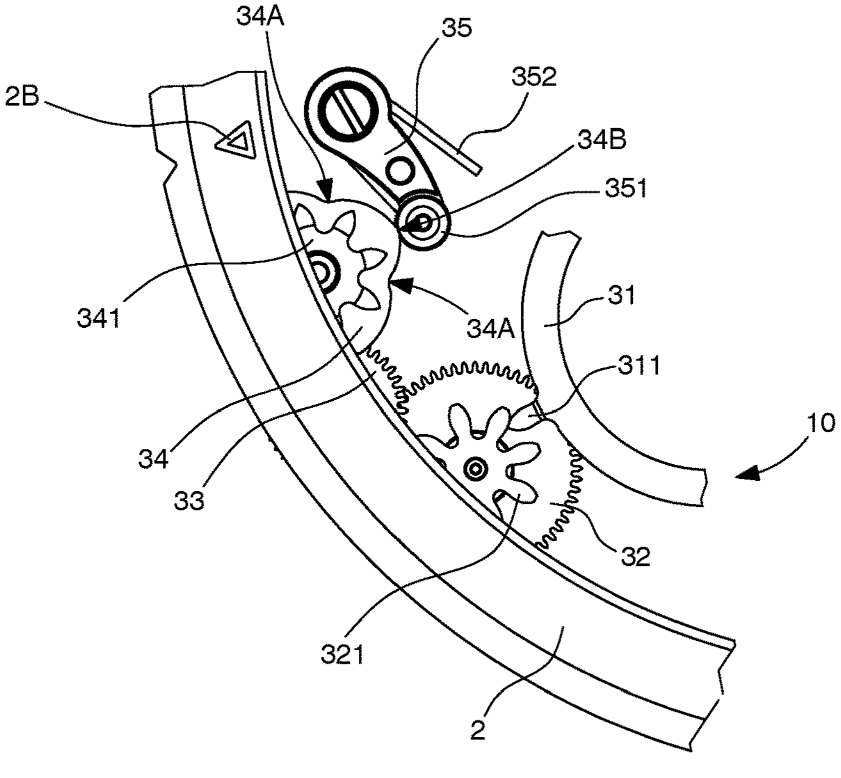

In a first variant, and as seen in FIGS. 1 and 2, month and leap year display mechanism 10 includes a month window 1C facing a static month scale 1D of dial 1, which month scale 1D comprises the succession of names of the different months. More particularly, month scale 1D extends at a central angle of 90° with respect to axis of rotation D. Month display wheel set 2 includes a display track, which is visible through month window 1C and includes four equidistant indices 2A or 2B, only one of which is visible at a time through month window 1C and permanently points to a mark corresponding to the current month on month scale 1D. More particularly, of the indices, one is a leap year index 2A and the other three are ordinary year indices 2B, leap year index 2A comprising a visible marking indicating to the user that it is a leap year. This leap year index 2A, which is different from the ordinary year indices 2B, can thus be integrated in the month display.

In the Figures, these indices are triangular, and leap year index 2A bears the letter S for the leap year (from the German 'Schaltjahr').

In a particular embodiment, the ordinary year indices 2B are different from one another, each comprising a numbered indication, visible to the user, of the number of years remaining until the next leap year.

In another particular embodiment, the ordinary leap year indices 2B are different from one another, each comprising a numbered indication, visible to the user, of the number of years elapsed since the last leap year.

Figure 7:
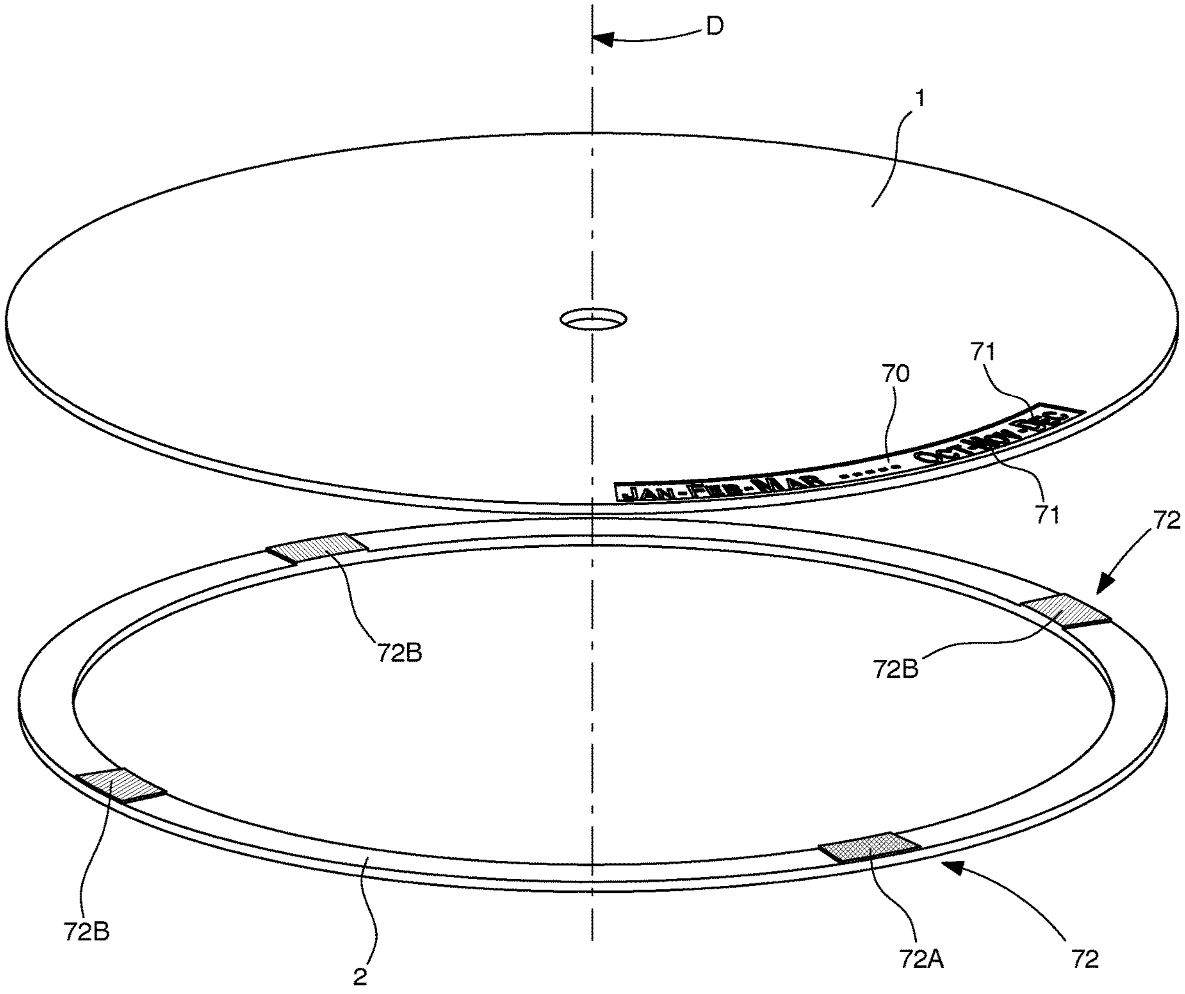
FIGS. 7 and 9 illustrate a second variant, wherein the month display wheel set bears lower markings, and the month window has an at least partially translucent crystal bearing twelve translucent upper markings, each corresponding to a month of the year; the month display wheel set rotates underneath this crystal, and the four lower markings are equidistant and are coloured and/or reflective revealing markings, each having the angular amplitude of a month marking.
Figure 8:
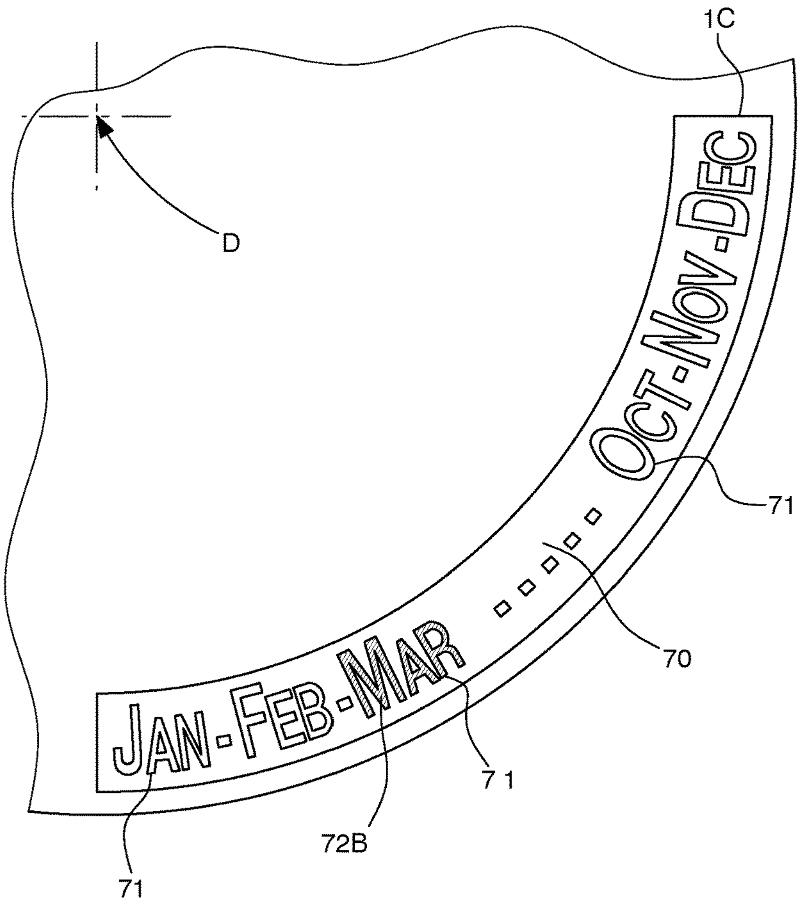
FIG. 8 illustrates the superposition thereof in March of an ordinary, non-leap year, during which a hatched lower marking specific to an ordinary year is visible through the opening of the letters of the month of March.
Figure 9:
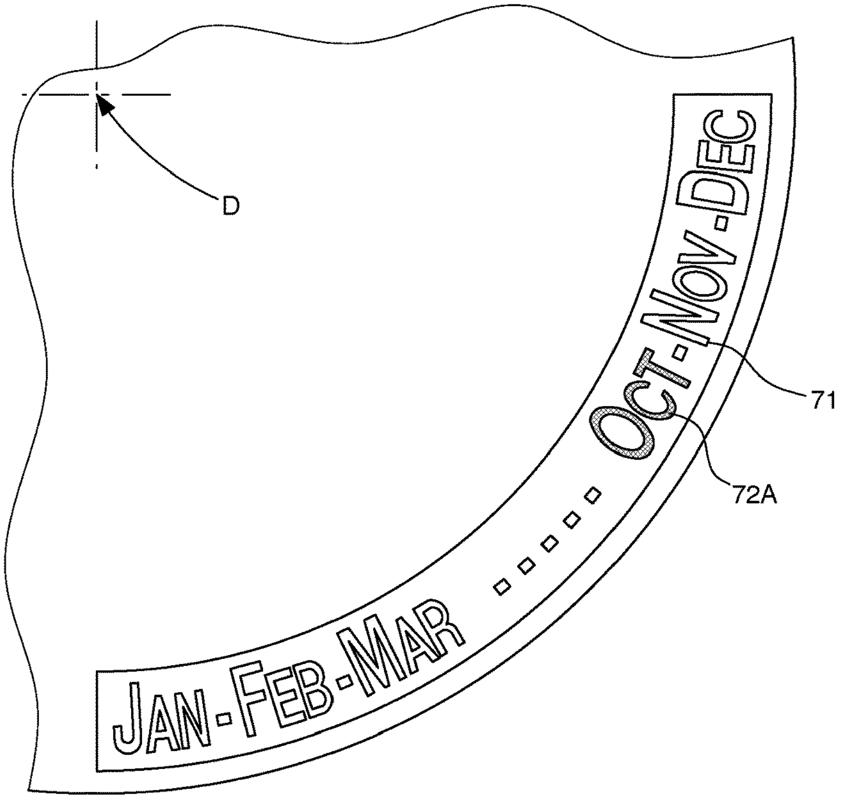

In a second variant, and as seen in FIGS. 7 to 9, month window 1C includes a fixed, at least partially translucent crystal 70 bearing twelve static, translucent upper markings 71, each corresponding to one month of the year. Month display wheel set 2 rotates underneath this crystal 70. This month display wheel set 2 bears four lower markings 72A and 72B which are equidistant, and which are revealing markings, particularly coloured and/or reflective markings, each having the angular amplitude of a month marking 71. Each of lower markings 72A or 72B is arranged to reveal the name of the current month by visual contrast with upper markings 71 of the other months, through the local superposition of the lower marking 72A or 72B concerned and the upper marking 71 of the current month. One of lower markings 72 is a leap year lower marking 72A and is different from the other lower markings 72 which are ordinary year lower markings 72B, and is arranged to produce, for the current month, a visual effect for the user which is different from the visual effects of the other months of the year. The four lower markings 72A and 72B can be formed of coloured surfaces, differentiated between leap year lower marking 72A and ordinary year lower markings 72B, and visible through a contouring of upper markings 71, or by different coloured reflective surfaces, or otherwise. The contour of upper marking 71 leaves the surface of display wheel set 2 in view, and thus only the name (or symbol) of the current month is revealed. FIGS. 7 to 9 illustrate a non-limiting example wherein leap year lower marking 72A is chequered, and ordinary year lower markings 72B have simple hatching; FIG. 8 illustrates the display of the month of March in an ordinary year, while FIG. 9 illustrates the month of October in a leap year. In a particular embodiment, crystal 70 may only be transparent at upper markings 71, for example inside the letters of the name of the month, as illustrated by FIGS. 8 and 9.

Figure 10:
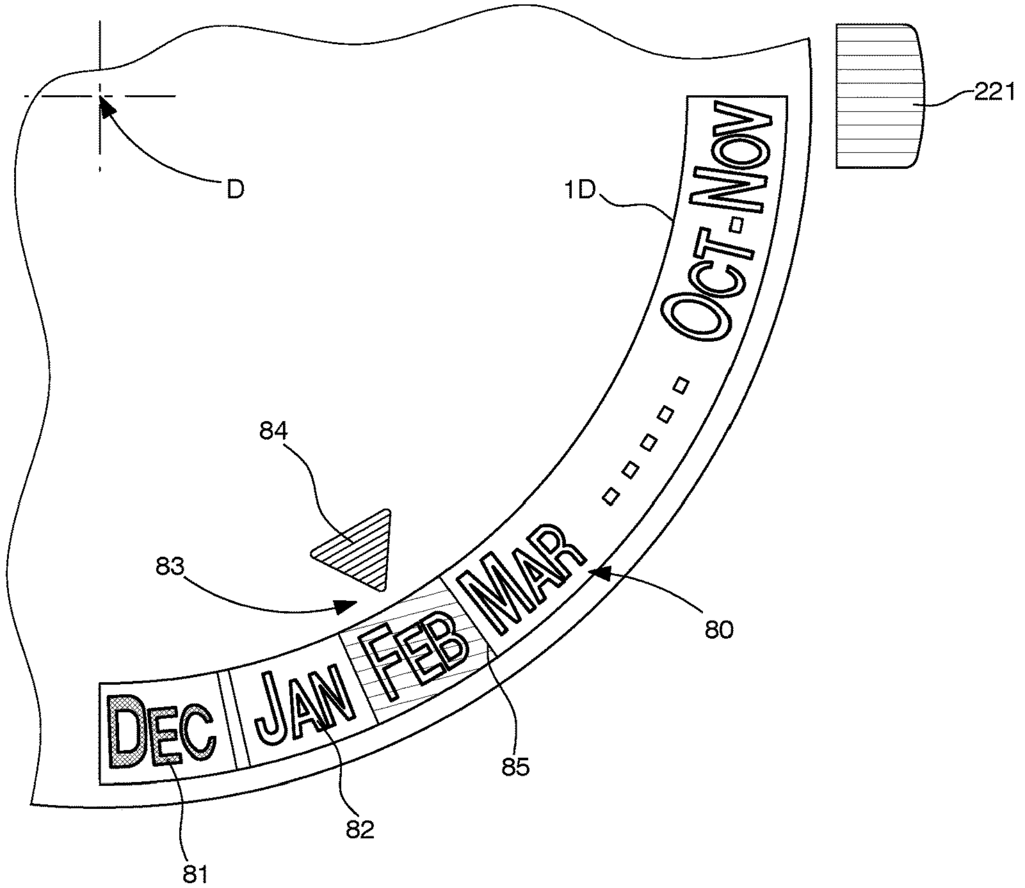
FIG. 10 illustrates a third variant, wherein the month display wheel set bears forty-eight equidistant month markings corresponding to the succession of months over four years and wherein one of the month markings, corresponding to the current month, is pointed to by a fixed mark on the dial, which is an index and/or a coloured translucent crystal; of these forty-eight month markings, twelve successive markings are leap year month markings and are different from the other thirty-six markings, which are ordinary year month markings; this Figure illustrates a non-limiting example wherein the ordinary year month markings have the names of the months in thin letters, whereas the leap year month markings have thicker letters, and wherein the current month of February of an ordinary year is visible underneath a translucent coloured crystal which itself faces a fixed index on the dial.
Figure 14:
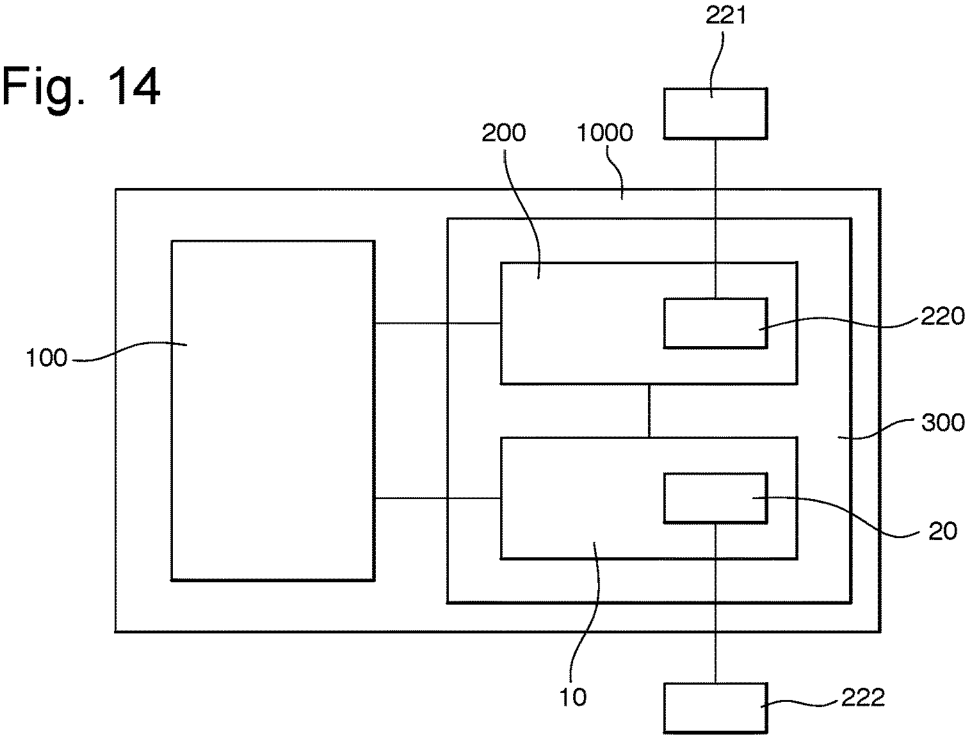
FIG. 14 is a block diagram representing a timepiece, particularly a watch, comprising a movement, a calendar mechanism with a date mechanism and its date corrector mechanism, and a month and leap year display mechanism according to the invention, with its month corrector.

In a third variant, and as seen in FIG. 10, month display wheel set 2 bears equidistant month markings 80 corresponding to the succession of months over four years, and wherein one of month markings 80 is pointed to by a fixed mark 83 of dial 1 which is an index 84 and/or a coloured translucent crystal 85. These month markings 80 are formed by forty-eight month markings 81 and 82, of which twelve successive markings are the leap year month markings 81 and are different from the other thirty-six markings 80 which are ordinary year month markings 82. FIG. 10 illustrates a non-limiting example wherein ordinary year month markings 82 have the names of the months in thin letters, whereas leap year month markings 81 have thicker letters, and wherein the current month is visible underneath a coloured translucent crystal 85 which itself faces an index 84. It is clear that month display wheel set 2 rotates by one forty-eighth of a revolution at the end of each month.

As regards control mechanism 3, in a particular, non-limiting manner illustrated in FIGS. 3 to 6, this control mechanism 3 comprises an input wheel set 31, which is arranged to be driven by the hour wheel of movement 100 or by a train meshing with the hour wheel or by a date mechanism 200. This input wheel set 31 has a finger 311, which is arranged to pivot a first star wheel 321 integral with an intermediate wheel 32. This intermediate wheel 32 meshes with a transformation train 33 to drive a stop wheel 34. Stop wheel 34 has hollows 34A, which are arranged to cooperate with a click 35 returned by a spring 352 to a rest position. This stop wheel 34 is integral with a second star wheel 341, whose teeth 342 are arranged to drive pins 22, comprised in month display wheel set 2, when stop wheel 34 pivots, and to hold these pins 22 in position when stop wheel 34 is kept stationary by click 35 in the absence of pivoting of first star wheel 321.

Input wheel set 31 pivots 1/31st of a revolution at the end of each day; it is preferably driven by a date mechanism 200, and, depending on the type of date mechanism (notably a perpetual calendar or annular calendar), this rotation may conventionally require 2 to 3 hours at the end of the day. The date mechanism performs the end of month correction.

More particularly, input wheel set 31 is integral with a wheel of a date mechanism 200.

It is also possible to envisage, although this is of limited interest, the month and leap year display mechanism 10 being independent of any date mechanism; in such case it is driven by a movement 100, and it is up to the user to make the end of month correction.

More particularly, input wheel set 31 is arranged to pivot first star wheel 321 once per month, on the last day of the month.

In the particular case of a lunar calendar, the conventional driving of a 59-toothed wheel makes it possible to actuate the pivoting of first star wheel 321 on the last day of a lunar month, for a zodiac or Muslim or Israelite or similar calendar display.

More particularly, stop wheel 34 has an alternation of hollows 34A and peaks 34B, and intermediate wheel 32 and transformation train 33 are arranged to drive stop wheel 34 through the angular pitch between two successive hollows 34A during each basic rotation of first star wheel 321.

More particularly, each basic rotation of first star wheel 321 causes a roller 351, comprised in click 35, to move up a cam ramp between a hollow 34A and a peak 34B on a first part of the angular pitch, against spring 352 in order to wind the latter. This spring 352 is arranged, when it unwinds after roller 351 has passed over peak 34B, to pivot stop wheel 34 on a second part of the angular pitch to a new rest position in which roller 351 is wedged in a hollow 34A until the end of the following month.

More particularly, each rotation of stop wheel 34 causes a rotation of 1/48th of a revolution of month wheel set 2.

More particularly, each basic rotation of first star wheel 321 causes a rotation of a quarter turn of stop wheel 34.

In the non-limiting variant illustrated by the Figures, during the change from the last day of a month to the first day of the next month, input wheel set 31 drives intermediate wheel 32 and causes it to make one eighth of a revolution. Transformation train 33 is then arranged to pivot stop wheel 34 a quarter of a revolution.

Stop wheel 34 is thus driven approximately a quarter of a revolution by input wheel set 31 via the intermediate wheel and transformation train 33. Of this 90° rotation, around 45° are used to release click 35 and to wind its spring 352, to the position shown in FIG. 6. After roller 351 has passed over peak 34B, spring 352 briefly pushes roller 351, which drops into the next hollow 34A of stop wheel 34, and this impulse causes month display wheel set 2 to pivot one forty-eighth of a revolution to display the next month in window 1C. Thus, stop wheel 34 is constantly in contact with pins 22 of month display wheel set 2. This stop wheel 34 rests all month on click 35, and it is only during the monthly movement of input wheel set 31 that stop wheel 34 makes a total rotation of a quarter turn, between the last day of the preceding month and the first day of the new month. Click 35 also rests throughout the month on a hollow 34A of stop wheel 34 and is only moved along the latter during the monthly motion imparted by input wheel set 31.

Naturally, other gear reduction factors can be employed without departing from the invention.

Advantageously, display mechanism 10 also includes a month correction mechanism 20, which is arranged to change the angular position of month display wheel set 2 on command by the user.

In a variant, this correction mechanism 20 comprises a drive element 222 directly operable by the user and arranged to drive month display wheel set 2 directly, by meshing, friction or magnetic cooperation.

In a variant, correction mechanism 20 comprises an actuator directly operable by the user and arranged to drive stop wheel 34 in rotation.

Figure 11:
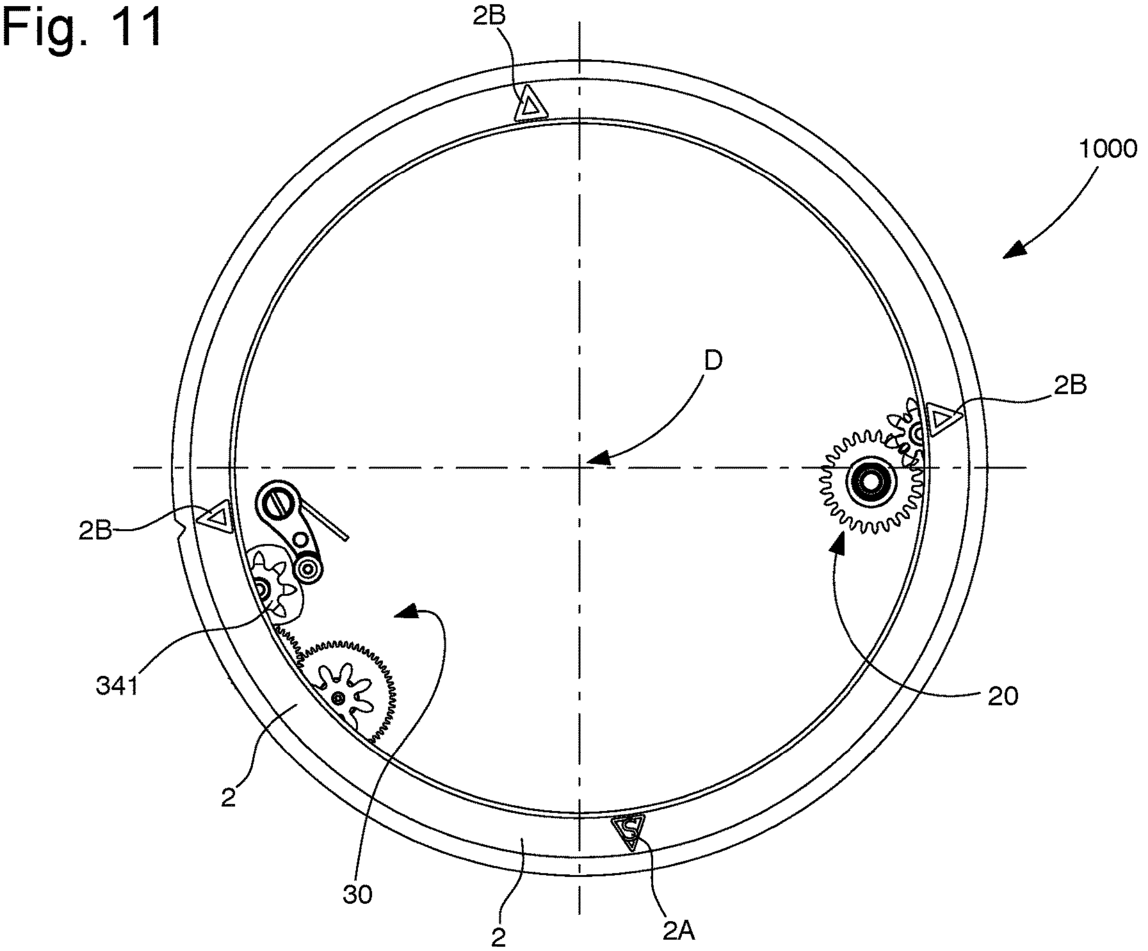
FIGS. 11 to 13 illustrate an example of a correction mechanism that can be used with each of these three variants.
Figure 12:
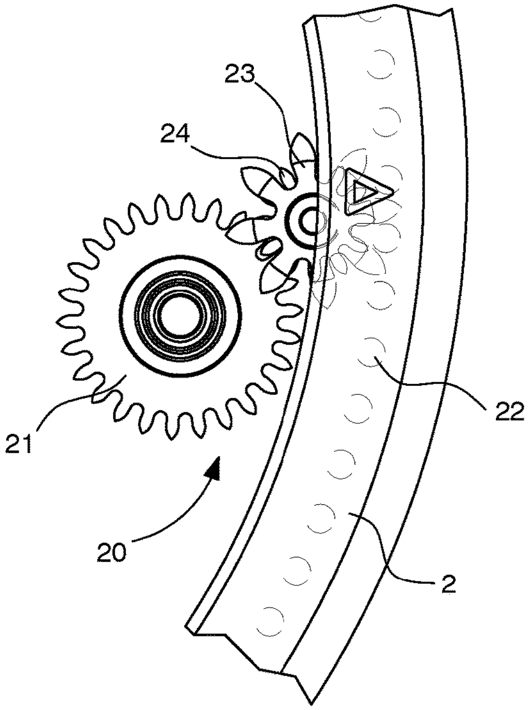
Figure 13:
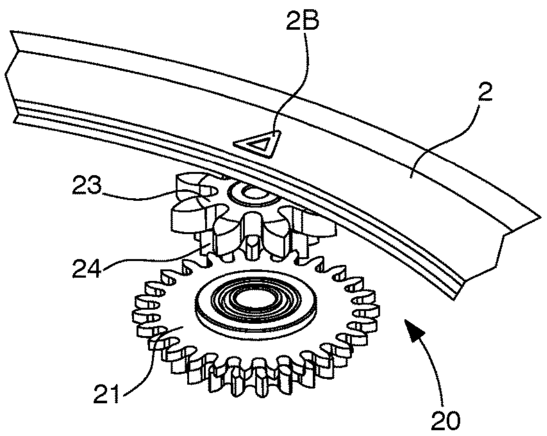

FIGS. 11 to 13 illustrate a non-limiting example of such a month correction mechanism 20, which comprises a user controlled mechanism (not represented) driving a correction wheel 21, which is arranged to move a correction pinion 24 integral with a correction star wheel 23, which is arranged to drive pins 22 of month display wheel set 2, in the same way that the second star 341 does at the end of the month; naturally this month correction mechanism 20 is designed to be able to overcome, without deformation, the resistant force that is permanently applied by spring 352 to said same second star wheel 341.

In an alternative, the correction can be made in a similar manner to that of the day of the week for calendar mechanisms displaying the day and date: in one of the positions of stem 221 and particular in position T2 of the stem, the date is corrected in a first direction of rotation, and the day of the week is corrected in a second direction of rotation opposite to the first. In the context of the invention, the correction would thus be as follows: in position T2 of the stem, the date is corrected in a first direction of rotation, and the position of month display wheel set 2 is corrected in a second direction of rotation opposite to the first.

The invention also concerns a calendar mechanism 300, which includes a date mechanism 200 arranged to cooperate with a movement 100 of a timepiece 1000, wherein calendar mechanism 300 includes at least one display mechanism 10 according to the invention. More particularly, this date mechanism 200 includes a train, which is arranged to count the number of days of the current month, and to cause input wheel set 31 to rotate $\frac{1}{31}$st of a revolution from the first to the 27th of the month, and, on the last day of the current month, to rotate $\frac{4}{31}$sts of a revolution when the current month has 28 days, or $\frac{3}{31}$sts of a revolution when the current month has 29 days, or $\frac{2}{31}$sts of a revolution when the current month has 30 days, or $\frac{1}{31}$st of a revolution when the current month has 31 days, to cause input wheel set 31 to make one complete revolution during the current month.

More particularly, date mechanism 200 has a date display 1B, and input wheel set 31 is arranged to control the position of date display 1B.

More particularly, date mechanism 200 includes a date corrector 220 arranged to change the position of date display 1B.

More particularly, date corrector 220 is also arranged to change the angular position of month display wheel set 2.

The correction is described above for the case of a Gregorian calendar. A similar correction mechanism, controlled by the movement or by the user, can be realized for other types of calendar, particularly a lunar calendar, which require corrections at certain times.

The invention also concerns a timepiece 1000 including at least one timepiece movement 10 arranged to drive at least one such display mechanism 10, and/or to drive at least one such calendar mechanism 300.

More particularly, this timepiece 1000 is a watch.

Naturally, the principle of the invention can be extended to other types of calendar timepieces, particularly astronomical watches or astronomical clocks, in which, in particular, according to the principle of the invention, it is possible to manage the year display in addition to the month display, by differentiating, on a year display wheel set, between ordinary years, leap years, century years not divisible by 400 which are not leap years and have a February of 28 days, and century years divisible by 400 which are leap years and have a February of 29 days, or millennial years, which, although theoretically leap years, have a February of 28 days.

In short, as a result of the present invention, it is possible easily to integrate in any timepiece a display that gives the user information as to whether it is a leap year, and/or, depending on the organisation of the display indices, how many years there are until the next leap year, or since the last one. The theoretical duration of February and the number of days in the current year are thus known. The invention allows correct adjustment of perpetual calendar mechanisms.

The invention allows a significant space saving inside the case of the timepiece concerned. Further, no additional indicator area is required on the timepiece dial. The essential classic displays of a wristwatch, like the time and date, remain perfectly clear and legible, and in the foreground.

The display is devised according to the principle of the Gregorian calendar or Julian calendar and is adaptable to any other type of calendar, particularly a lunar calendar.

Further, this display is not temporally limited, and does not lose its function on any expiry date.

The display mechanism according to the invention is economical, as is its correction mechanism.

The invention claimed is:

1. A month and leap year display mechanism for a timepiece, wherein said mechanism comprises a leap year display integrated in a month display, said mechanism comprising a movement or being arranged to cooperate with a movement, the movement is arranged to drive, via a control mechanism comprised in said mechanism, a month display wheel set rotating about an axis of rotation and arranged underneath a cover plate or underneath a dial, and wherein a month window contained within an angular sector of 90° about said axis of rotation is arranged to allow a user to see a quarter of said month display wheel set, the other three-quarters of said month display wheel set being concealed from the user, and wherein said control mechanism is arranged to make said month display wheel set complete one revolution in four years, and wherein said month display wheel set bears, over an angular sector of 90°, at least one characteristic leap year marking, and either carries indices, each arranged to indicate one month on a static month scale of said dial, or equidistant month markings, wherein one of the month markings is pointed to by a fixed mark of said dial, wherein said control mechanism comprises an input wheel set which is arranged to be driven by an hour wheel of said movement or by a train meshing with said hour wheel or by a date mechanism, said input wheel set comprising a finger arranged to pivot a first star wheel integral with an intermediate wheel which meshes with a transformation train to drive a stop wheel which comprises hollows arranged to cooperate with a click returned by a spring to a rest position, said stop wheel is integral with a second star wheel, whose teeth are arranged to drive pins comprised in said month display wheel set when said stop wheel pivots and to hold said pins in position when said stop wheel is kept stationary by said click in the absence of pivoting of said first star wheel.

2. The month and leap year display mechanism according to claim 1, comprising at least the cover plate or the dial including the month window facing said month scale, wherein said display mechanism comprises the month display wheel set formed by a disc or a ring arranged to be driven indirectly by said movement about said of rotation and partially visible to the user inside said month window, wherein said month scale extends at a central angle of 90° with respect to said axis of rotation, wherein said control mechanism is arranged to cause said display wheel set to make one revolution in four years, and wherein said month display wheel set includes a display track, which is visible through said month window and comprises four equidistant indices, only one of which is visible at a time through said month window and permanently points to a mark corresponding to the current month on said month scale, and wherein, of said indices, one is a leap year index and the other three are ordinary year indices, said leap year index comprising a visible marking indicating to the user that it is a leap year.

3. The display mechanism according to claim 1, wherein said month display wheel set is a display ring or disc, which bears said indices arranged to indicate a month on a static month scale of said dial, said indices being formed by four equidistant indices, only one of which is visible at a time through said window, said indices being arranged to point to the current month on a month scale of said dial, and wherein, of said four indices, a leap year index is different from the other ordinary year indices, and can be integrated in the month display.

4. The display mechanism according to claim 3, wherein said ordinary year indices are different from one another, each comprising a numbered indication, visible to the user, of the number of years remaining until the next leap year.

5. The display mechanism according to claim 3, wherein said ordinary year indices are different from one another, each comprising a numbered indication, visible to the user, of the number of years elapsed since the last leap year.

6. The display mechanism according to claim 1, wherein said month display wheel set bears said equidistant month markings corresponding to the succession of months over four years, and wherein one of said month markings is pointed to by a fixed mark of said dial which is an index and/or a coloured translucent crystal, said month markings being formed by forty-eight month markings, of which twelve successive markings are leap year month markings and are different from the other thirty-six markings which are ordinary year month markings.

7. The display mechanism according to claim 1, wherein said input wheel set is arranged to pivot said first star wheel once per month, on the last day of the month.

8. The display mechanism according to claim 1, wherein said stop wheel comprises an alternation of said hollows and peaks, and wherein said intermediate wheel and said transformation train are arranged to drive said stop wheel through the angular pitch between two successive hollows during each basic rotation of said first star wheel.

9. The display mechanism according to claim 8, wherein each basic rotation of said first star wheel causes a roller, comprised in said click, to move up a cam ramp between a said hollow and a said peak on a first part of said angular pitch, against said spring in order to wind the latter, and wherein said spring is arranged, during unwinding thereof after said roller has passed over said peak, to pivot said stop wheel on a second part of said angular pitch to a new rest position in which said roller is wedged in a said hollow until the end of the following month.

10. The display mechanism according to claim 1, wherein each rotation of said stop wheel causes a rotation of $\frac{1}{48}$th of a revolution of said month display wheel set.

11. The display mechanism according to claim 1, wherein each basic rotation of said first star wheel causes a rotation of a quarter of a revolution of said stop wheel.

12. The display mechanism according to claim 1, wherein said display mechanism comprises a month correction mechanism arranged to change the angular position of said month display wheel set on command by the user.

13. The display mechanism according to claim 12, wherein said correction mechanism comprises a drive element directly operable by the user and arranged to drive said month display wheel set directly, by meshing, friction or magnetic cooperation.

14. The display mechanism according to claim 12, wherein said correction mechanism comprises an actuator directly operable by the user and arranged to drive said stop wheel in rotation.

15. A calendar mechanism comprising a date mechanism arranged to cooperate with a movement of a timepiece, wherein said calendar mechanism includes at least one display mechanism according to claim 1, and said date mechanism includes a train arranged to count the number of days of the current month, and to cause said input wheel set to rotate $\frac{1}{31}$st of a revolution from the first to the 27th of the month, and, on the last day of the current month, to rotate $\frac{4}{31}$sts of a revolution when the current month has 28 days, or $\frac{3}{31}$sts of a revolution when the current month has 29 days, or $\frac{2}{31}$sts of a revolution when the current month has 30 days, or $\frac{1}{31}$st of a revolution when the current month has 31 days, in order to make said input wheel set complete one revolution during the current month.

16. The calendar mechanism according to claim 15, wherein said date mechanism comprises a date display, and wherein said input wheel set is arranged to control the position of said date display.

17. The calendar mechanism according to claim 15, wherein said date mechanism comprises a date corrector arranged to change the position of said date display.

18. The calendar mechanism according to claim 17, wherein said date corrector is also arranged to change the angular position of said month display wheel set.

19. A timepiece including at least one timepiece movement arranged to drive at least one display mechanism according to claim 1.

20. The timepiece according to claim 19, wherein said timepiece is a watch.

* * * * *